Jan. 25, 1938.  R. L. CARR  2,106,403

VEHICLE BODY

Filed Sept. 21, 1933  6 Sheets-Sheet 1

Inventor
Raymond L. Carr

Jan. 25, 1938. R. L. CARR 2,106,403
VEHICLE BODY
Filed Sept. 21, 1933 6 Sheets-Sheet 4

Inventor
Raymond L. Carr

Jan. 25, 1938. R. L. CARR 2,106,403
VEHICLE BODY
Filed Sept. 21, 1933 6 Sheets-Sheet 5

Patented Jan. 25, 1938

2,106,403

UNITED STATES PATENT OFFICE 2,106,403

VEHICLE BODY

Raymond L. Carr, Boston, Mass.

Application September 21, 1933, Serial No. 690,331

19 Claims. (Cl. 296—84)

This invention relates to an improved windshield and to the combination of such a windshield with a wiper mechanism.

Windshields heretofore provided have generally been of the common, flat, or planar form with the glass screen either vertically disposed or rearwardly inclined, or have been of the so-called V-shaped type, having two glass sheets located at an obtuse angle in relation to each other and inclining outwardly and rearwardly from the center of the vehicle.

The present invention affords a windshield which includes a glass screen that may be of generally curved form, preferably having only a slight curvature at its upper edge and having a substantial curvature at each end of its lower edge with the intermediate part of this edge substantially straight or only slightly curved. Such a glass screen has substantially the shape of a surface portion of a frustum of a wedge having an oval base, and may be in the general form of a theoretical surface generated by the movement of a straight line (or a slightly curved line). The present invention affords a windshield which is especially advantageous in affording an unusually wide field of vision between the windshield standards, as well as a more favorable angle of view beneath the front edge of the top. The standards may be located beside of rather than in front of the driver of the vehicle, so that his ordinary field of vision under actual driving conditions is not interfered with by the adjoining opaque standard. Furthermore, this shape of windshield offers superior aerodynamic qualities and enhances the stream-lining of the vehicle, not only reducing wind resistance but conforming to the design and appearance of generally stream-lined designs. Not only does a windshield of this type permit a wider field of vision between the opaque posts, but the glass is so disposed that distortion, particularly in a horizontal direction due to refraction, is minimized. Theoretically there is no distortion due to refraction if the line of sight is exactly perpendicular to the plane of the transparent screen; as the angle of the line of sight to the plane increases, the refraction also increases; therefore, the perfect condition would involve a screen defining the surface of a cylinder or solid of revolution with the eye located in its central axis. Obviously a curved wind screen more nearly approaches this ideal condition than does a flat, planar type or V-shaped windshield.

In practice I prefer to arrange the glass screen so that the lower edge thereof has its ends substantially following arcs drawn about a central axis passing through the average position of the eyes of the occupants of the front seat, and its intermediate part is substantially straight or but slightly curved. Thus, both ends of the windshield afford substantially less distortion to vision than that provided by windshields heretofore employed, while the central portion thereof is substantially flat and affords a distortion to vision similar to that of a conventional planar windshield but less than that of the V-shaped windshield.

This invention further affords an arrangement of the windshield standards so that they may be relatively narrow as viewed by the driver of the vehicle, thus affording a minimum obstruction to vision while their dimensions in the direction of the driver's line of sight may be ample to afford adequate structural strength. If desired, the windshield standard assembly may be arranged so that the front edge of the side window may be substantially concealed even when the latter is in a partially raised position, although the windshield itself has a very appreciable inclination upwardly and rearwardly to reduce wind resistance, to avoid objectionable reflections interfering with the vision of the driver, and to reduce the necessary length of the top and super-structure of the vehicle.

The provision of a generally curved windshield makes it impractical to use the conventional types of windshield wipers which oscillate over planar surfaces. Accordingly, in order to afford a practical windshield assembly, I have devised windshield wiper mechanisms adapted to provide wiper portions following the curved surfaces of this general type of windshield, as well as being adapted for use with other generally curved windshields. Such a windshield wiper preferably is provided with a wiper element in the form of a tension member which extends between the windshield standard assemblies. Accordingly, the wiper element moves upwardly and downwardly, occupying a generally horizontal position throughout its path. As is well recognized, an opaque member of a given size in the field of vision affords substantially less objectionable obstruction to vision if disposed with its longer axis extending horizontally rather than with its axis extending vertically. Accordingly, this novel type of wiper element affords a minimum objectionable obstruction to vision, and may, when out of use, lie in a suitable recess in the cowl assembly entirely out of the field of vision. Furthermore, the operating elements for this windshield wiper may be arranged in the cowl and windshield standard assemblies so that there is no impairment to vision aside from that afforded by the actual wiping element. If desired, a wiper may be provided which follows a path substantially like that of a line moved to generate a theoretical surface shaped like that of the wind screen.

In order to provide a windshield which is attractive in appearance, which affords low wind resistance and a minimum impairment to vision, I prefer to employ a wind screen having the general form of a portion of a surface of a wedge with an oval base. A wind screen of this type may have each end portion particularly adjoining its lower edge with a very substantial curvature substantially conforming to an arc drawn about a center which lies near or in a substantially vertical axial line intersecting the region to be occupied by the eyes of the occupant of the front seat when in normal position on the same side of the vehicle.

Figure 3:
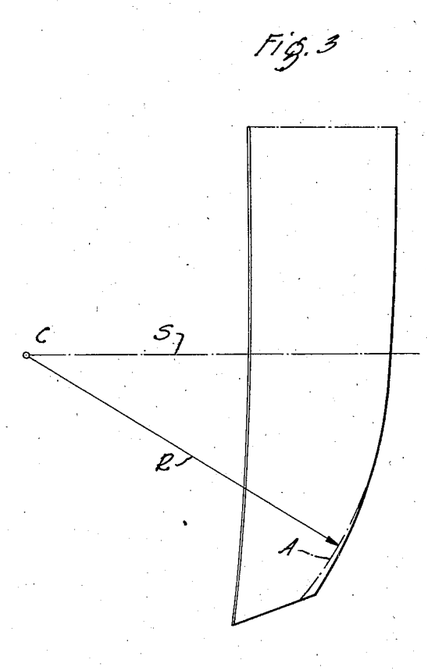
Fig. 3 is a diagrammatic view showing the theoretical outline of one half of the glass screen as viewed from above and showing the relationship of this outline to the normal eye position of the occupant of the front seat.
Figure 4:
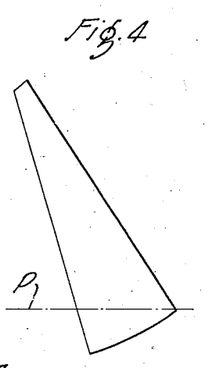
Fig. 4 is a side elevation of the screen shown in Fig. 3.

Figs. 3 and 4 are illustrative of the general shape of the glass wind screen or windshield panel. In Fig. 3 the center C is disposed in an axial line substantially vertically disposed and in the region of the normal position of the eyes of the occupant of the front seat. If a line or radius R is drawn about the center C in a substantially horizontal plane, designated P in Fig. 4, the outer end of the line will define an arc A. Preferably the wind screen is shaped so that its lower part substantially conforms to the arc A in the plane P. If a rectangular piece of glass is bent to afford such a shape, its lower corner obviously projects downwardly and forwardly below the arc, while its outer edge will incline upwardly and outwardly if its upper edge is provided with only a slight curvature, as is preferred, to permit the front of the top to be substantially straight. Preferably the intermediate part of the edge of such a rectangular screen would lie in the plane P and extend substantially in a straight line or have only a slight outward curvature or forward bulge. Preferably the lengths of the upper and lower edges of the wind screen may be substantially the same. Since the lower edge has a substantial curvature and the upper edge is nearly straight, the sides of the wind screen may incline upwardly and downwardly, thus conforming to the usual positioning of the windshield standards. It is evident that the theoretical form of such a wind screen may be substantially defined by the movement of a straight line from an outwardly and upwardly inclined position at the end of the screen to a rearwardly inclined position at the center of the screen wherein the line is in the longitudinal central plane of the vehicle.

This general type of windshield is advantageous since in the region between the end of the windshield and the line marked S, which is the normal straight ahead line of vision of the seat occupant, the portion of the glass through which the occupant is normally looking approaches a curvature about the center C. Accordingly, the line of sight may be considered substantially normal to the lower part of the screen in so far as horizontal distortion to vision is concerned. It is of course recognized that under ordinary driving conditions horizontal distortion is much more serious than distortion in a vertical direction. Between the line S and the central longitudinal plane of the vehicle, the distortion afforded by a windshield of this type is very similar to that provided by a straight windshield, while at the remote end of the windshield between a plane corresponding to the plane S and the remote extremity of the windshield, the distortion to vision is again substantially less due to the nearer approach to the theoretical ideal cylindrical shaping of the windshield. Obviously if the intermediate part of the windshield had a substantial curvature outwardly and forwardly such a shaping of the glass would deviate much further from the ideal of the glass cylinder disposed about the axial line C than is the case with a windshield of the type disclosed herewith.

Figure 1:
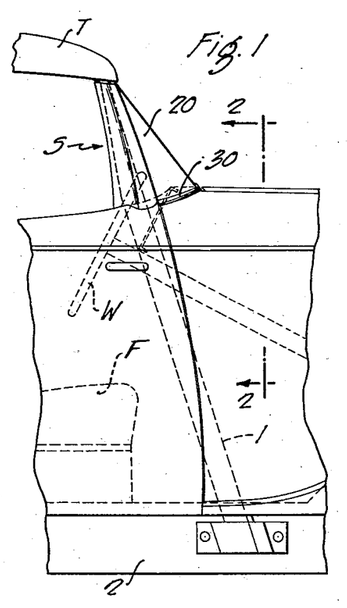
Fig. 1 is a side elevation of a portion of a vehicle body showing the arrangement of my novel windshield in relation to the adjoining component parts of the vehicle, such as the top, the front seat, the steering wheel, and related parts.

While this general form of windshield might be arranged so that it was disposed in a generally vertical plane for purposes of appearance and other practical considerations, it is highly desirable to have a generally rearward tilt to the glass. Obviously the angle of inclination of the central part of the windshield is substantially greater than that of its ends. Thus, as shown in Fig. 1, the intermediate part of the windshield has an inclination of the order of 37°, while the standards only have a slight rearward inclination. In practice the theoretical design of windshield illustrated in Figs. 3 and 4 may be departed from by bending glass sheets which are not rectangular in form, for example, by extending the upper and lower margins of the glass as desired to fit the cowl assembly and the top and to give a more attractive appearance.

Figure 24:
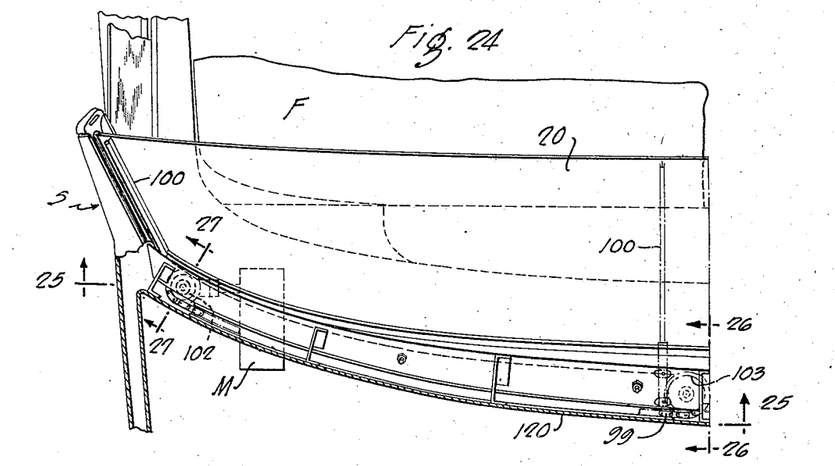
Fig. 24 is a top view of a windshield assembly similar to that of Fig. 4 but having parts of the cowl broken away to show an optional wiper arrangement.

A wind screen of this general shape may be supported in windshield standards, each of which have their minimum dimension extending substantially transversely of the line of sight from a center C, and their maximum dimension extending substantially in the direction of this line of sight. As shown in Figs. 1 and 24, the windshield standard assemblies, indicated in general by reference character S, may be located close to or beside the front edge of the front seat F. Accordingly, the range of vision between the standards is very wide, and under ordinary driving conditions it is not necessary for the driver to look to one side of one of the standards rather than between the same. At the end of the screen, the curved lower margin of the glass may be located roughly in spaced parallelism to the curved rim of the steering wheel, which has a portion disposed between the standards, as shown in Fig. 1. In practice, the necessary clearance between the glass and steering wheel determines the rearmost practical position for the lower part of the glass, but the shape of my windshield permits the upper parts of the standards and the windshield header or front of the top to be located substantially in the vertical transverse plane of the center of the wheel; while the entire standards may be located substantially behind the foremost point on the wheel rim. Accordingly a large field of vision is afforded beneath the front of the top and between the standards.

Preferably the windshield standard proper may be in the form of a metal member 1 having a channel-like cross-section, and extending upwardly from the frame 2 of the vehicle. Adjoining the lower part of the wind screen (Fig. 8), the rear wall or flange 3 of each channel member 1 may incline toward the front flange 4 (Fig. 8) so that these flanges converge toward the top of the standard, thus permitting the standard to have a larger cross-section adjoining the cowl than at its upper end, and affording a member having substantially the advantageous disposition of material which characterizes a cantilever beam. At the upper end of the member 1 an integral cap 5 may be provided for connection to the top T which may be either permanent or folding as desired.

Forming a part of the windshield standard assembly is an extension 10 of the front door post 9, this post including a channel portion 11 to receive the front edge of the front window 12. Preferably the extension 10 projects forwardly from the rear edge of the channeled portion 11 and extends partly about the front of the windshield standard proper. The lower part of this extension 10 is connected to the front edge of the door, which may substantially register with the front edge of the windshield standard assembly. Thus a relatively wide door is provided and adequate room is afforded, particularly for the feet of people entering and leaving the vehicle, despite the windshield standards S which are located relatively far back adjoining the front seat. This arrangement is of the general character disclosed in my copending application No. 1,967, filed January 15, 1935. The extension 10 of the post 9 is similar to that disclosed in my copending application Serial No. 360,105, filed May 3, 1929, and may have a substantially planar portion 13 substantially paralleling the line of sight of the driver of the vehicle. Thus the arrangement of the door post and the windshield standard cooperate in affording a windshield standard assembly which is comparatively small in cross-section, as viewed by the vehicle driver.

Figures 5, 7A, 8:
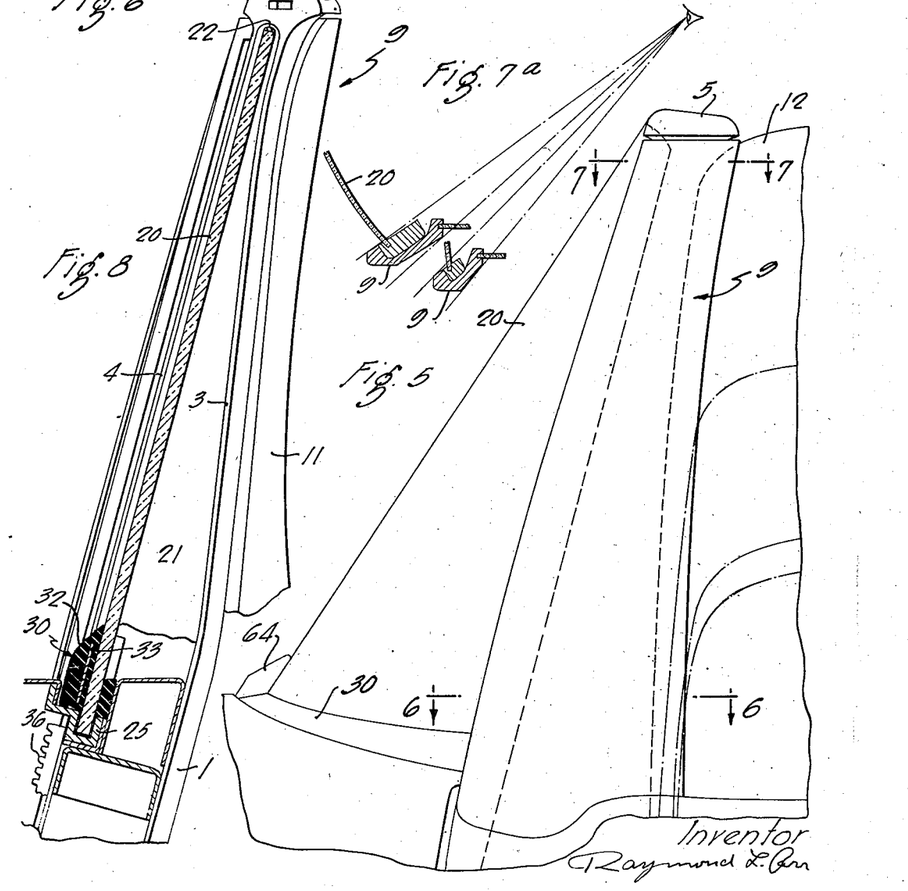
Fig. 5 is a side elevation of the windshield assembly showing the relationship of the side window to the same.
Fig. 7a is a diagrammatic view showing the relation of the upper and lower parts of the windshield standard and the normal position of the driver's eyes.
Fig. 8 is a side elevation taken from the inside of the vehicle showing the windshield standard assembly, the wind screen and related parts being shown in section.

As shown in Fig. 5 the side window 12 may have its front edge so shaped and arranged that it may remain in a substantially concealed position throughout the path of the panel from a fully raised to a fully concealed position, this general arrangement being of the type also disclosed in my above-identified copending application Serial No. 360,105.

Figure 6:
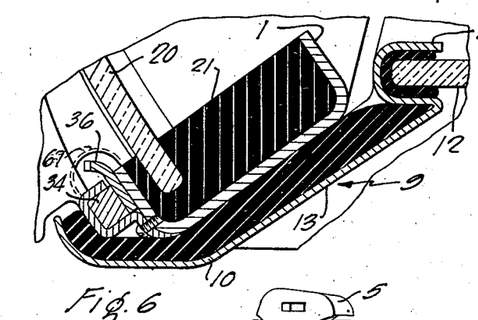
Figs. 6 and 7 are sections on line 6—6 and 7—7 of Fig. 5, respectively.
Figure 7:
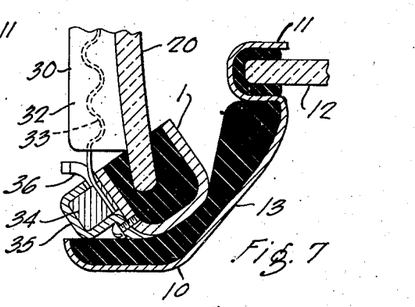

Since the standard S slopes rearwardly, the angular relationship of the channel 11 to post 9 and of the windshield standard 1 is somewhat different at the upper and lower parts of the standard, Figs. 6, 7, and 7a illustrate this arrangement, the channel 11 being spaced inwardly more in relation to the upper part of the standard 1 than is the case adjoining the cowl assembly. The glass wind screen 20, which may be of the general shape already described, preferably has its edges received in suitable rubber blocks 21 disposed within the channels of the windshield standards 1, and its upper edge may be provided with a light, curved metal strip or bead 22. The lower edge of the glass screen 4 may extend slightly below the outer surface of the cowl assembly, and may be received in a channel 25, the ends of which are secured to the standards 1, and the intermediate part of which obviously curves forwardly to conform to the shape of the lower margin of the screen.

In accordance with this invention, a wiper mechanism may be provided to include a wiper element which maintains a generally horizontal position throughout its path, and which moves upwardly and downwardly sweeping over substantially nearly all of the exposed surface of the wind screen 20. Such a wiper element 30 may have a core strip 31, Figs. 11 and 12, in the form of a metal ribbon, and has a covering portion or jacket 32 which may be conveniently formed of rubber. Preferably the lower part of the element 30 may have substantially right angled corners, while its upper surface may be inclined downwardly and forwardly to afford a beveled edge moving over the glass as the wiper is lifted. Adjoining the ends of the element 30, the core member 31 may be discontinued and wider somewhat triangular shaped metal ribbon elements 33 are secured to the ends of member 31, as by fastenings 34', Fig. 14. Preferably the elements 33 are of wave-like or undulatory form, as shown in Fig. 7, thus affording spring means to permit slight variation in the length of the element 30 and to permit the holding of the same under tension against the forwardly bulging or curved wind screen.

The ends of the elements 33 are secured to elongate bars 34 which may be of square cross-section and may be received in guides 35 (Fig. 7) secured to the front flanges of the respective channels 1. The shape of the parts 34 and 35 is such that the ends of the wiper strip 30 are held in place despite considerable tension upon the latter. At the upper end of the guide 35 a filler block 137 may be provided and welded to the walls of the guide, thus to oppose any tendency of these walls to spread under the tension of element 30. Extending from the bar 34 through a slot in the guide 35 is a rack element 36 having teeth which may register with a driving gear 37, Figs. 12, 15, and 17. Accordingly, rotation of the driving gear 37 may be effective in causing the upward or downward movement of the bar 34 and of the adjoining end of the wiper element 30. Obviously gears 37 are provided adjoining each of the standards 1 and are driven in synchronism so that each end of the wiper element 30 moves upwardly and downwardly at the same time. Each gear 37 is driven in one direction for a certain number of revolutions to permit the wiper element to move upwardly from the cowl assembly nearly to the top T, whereupon the direction of rotation of each gear 37 is reversed to effect down movement of element 30.

Figure 2:
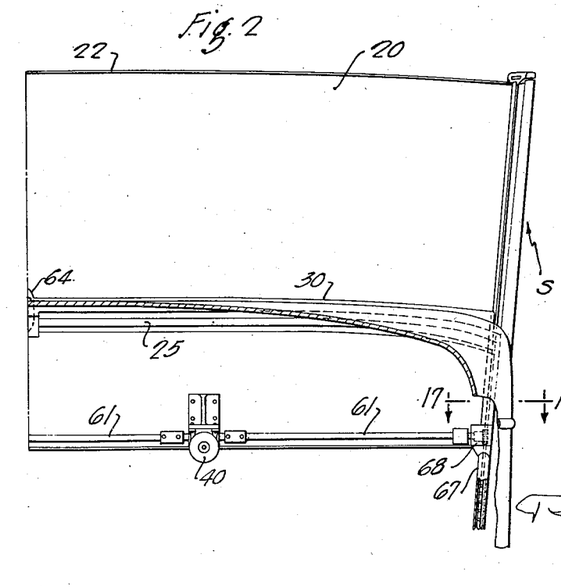
Fig. 2 is a section on line 2—2 of Fig. 1.
Figure 9:
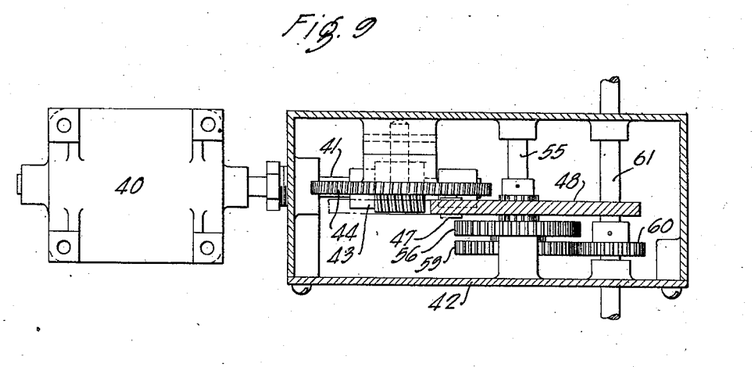
Fig. 9 is a view partly in section and partly in plan of the driving mechanism for my improved windshield wiper.
Figure 10:
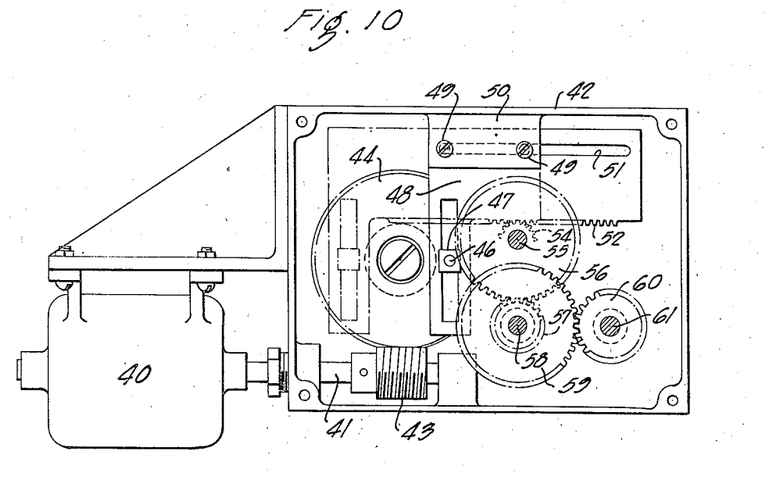
Fig. 10 is a side elevation of this assembly with its cover removed.
Figures 11, 12, 13, 14, 15, 16, 17, 18:
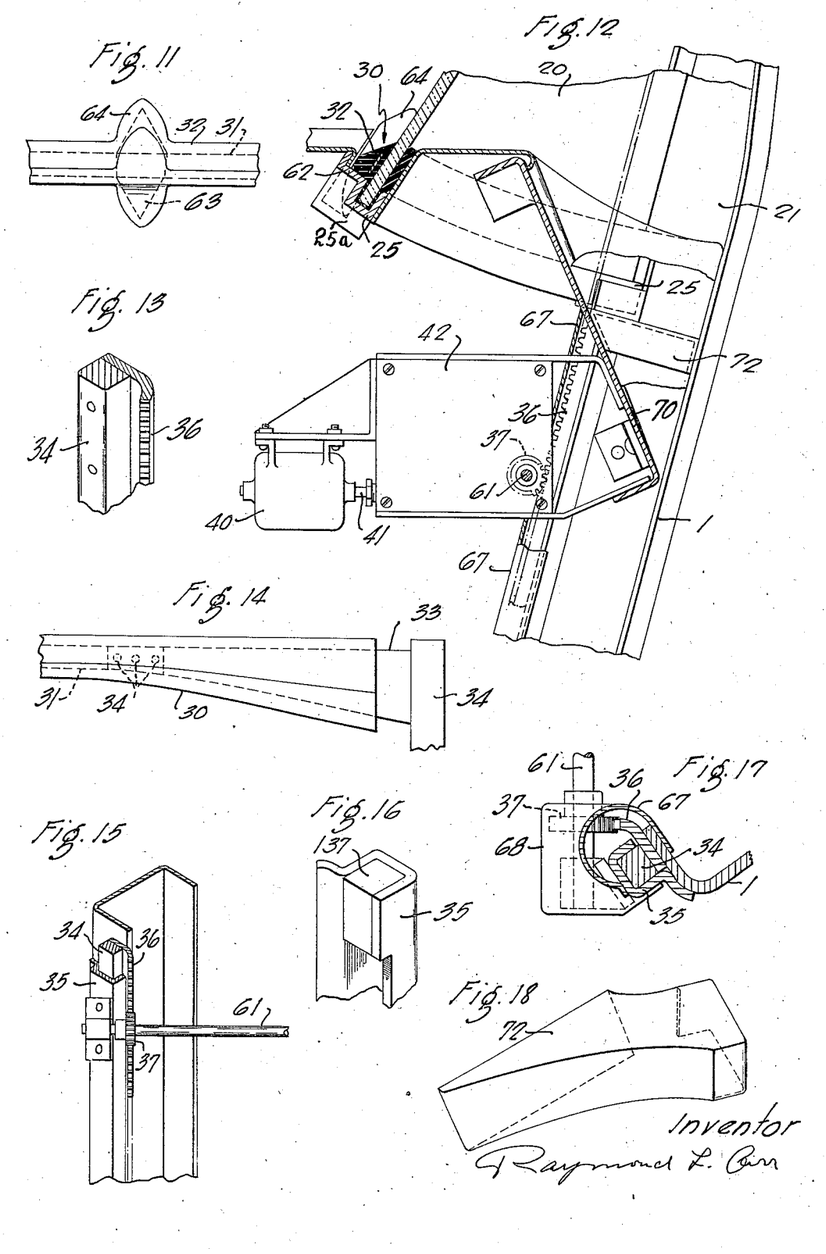
Fig. 11 is an elevational detail of the intermediate portion of the wiper element.
Fig. 12 is a central longitudinal sectional view of the cowl assembly showing a portion of the windshield standard, the wiper mechanism, the wiper element and associated parts.
Fig. 13 is a perspective detail of a portion of a wiper driving element.
Fig. 14 is an elevational detail of the end of the wiper element and related parts.
Fig. 15 is a front elevation of a portion of the windshield standard and related parts of the windshield wiper driving mechanism.
Fig. 16 is an isometric detail of a portion of the wiper mechanism.
Fig. 17 is a section on line 17—17 of Fig. 2.
Fig. 18 is an isometric view of a cowl bracket.

Figs. 9 and 10 particularly illustrate mechanism to drive the gears 37 in this manner. The assembly shown in these figures may be conveniently disposed beneath the cowl of the vehicle, as shown in Figs. 2 and 12. An electrical motor, or any other suitable prime mover, 40 forms a part of this assembly, and is provided with a shaft 41 extending into a housing or gear case 42, the latter may be substantially in the form of a metal box carrying a bracket upon which the motor 40 is supported, the entire assembly being mounted on any suitable support or bracket in the cowl of the vehicle. Within the casing 42 the shaft 41 may be provided with a worm 43 engaging a worm wheel 44 so that rapid rotation of the shaft 41 results in relatively slow rotation of gear 44. Extending from the gear 44 is a pin or stud 46 carrying a head portion 47 and slidingly engaging a vertical slot in a rack plate 48, the latter slides between guide plates 50 depending from the top wall of the box 42 and supporting horizontal bolts or pins 49 extending through a horizontal guide slot 51 in the plate 48. The lower edge of the latter is provided with a plurality of teeth 52 in the form of a rack meshing with the teeth of a spur gear 54 on a horizontal shaft 55. A larger gear 56 fixed to this shaft meshes with a small gear 57 on a countershaft 58, while a larger gear 59 on shaft 58 engages a pinion 60 on a shaft 61 extending outwardly through the walls of the gear case 42 and supporting the gears 37 at its ends.

In the operation of this windshield wiper mechanism, a suitable source of electric current is provided for the motor 40 and when the control circuit is closed, the shaft 41 may be driven at relatively high speed, causing the rotation of the gear 44 at a substantially lower speed. This results in the horizontal reciprocating movement of the rack member 48. Accordingly, the shaft 55 is rotated in one direction for a short period of time and the shafts 58 and 61 are similarly rotated. When the reciprocating rack member 48 reaches one end of its path, its direction of motion is reversed, and the direction of rotation of each of shafts 55, 58, and 61 is also reversed. Accordingly this arrangement permits the relatively slow movement of the reciprocating member 48 through a limited path and due to the gear train disposed between this member and shaft 61, this results in a faster rotation of the shaft 61 and gears 37 for several revolutions, first in one direction and then in the opposite direction. Accordingly, the gears 37 are effective in causing the upward and downward movement of the rack bars 36, and the upward and downward movement of the wiper element 30. Obviously the relative gear ratios and the range of the path of the rack member 48 may be varied to afford any desired results of this character in so far as the speed and range of movement of the element 30 is concerned. The arrangement of the driving mechanism causes the element 30 to have a substantially harmonic motion, moving faster in the intermediate part of its path and slower at the upper and lower ends of the same, so that there is little strain imparted to the mechanism due to the reversal of the direction of movement of element 30 at each end of its path.

When the element 30 is at the lower end of its path, it may be received in a gutter 62 (Fig. 12) afforded by an extension of the front wall of channel 25. Thus in its normal inoperative position the element 30 may lie in a very unobtrusive position substantially below the surface of the cowl, thus avoiding impairment to vision.

In order to avoid the possibility of the twisting of the element 30, a central extension 64 may be provided, as shown in Figs. 11 and 12, to afford an additional surface engaging the outer face of the wind screen 20. This extension may be provided by an integral upwardly and downwardly extending projections of the rubber core 32 of element 30, and with an inner sheet metal plate 63 secured to the central portion of the metal ribbon 31. Thus a relatively long bearing surface upon the central portion of the wind screen is afforded so any tendency of the element to twist or turn does not result in any objectionable catching of the element. The central part of the gutter 25 may be provided with a depressed portion 25ᵃ to receive the downwardly projecting part of the enlargement 68 of element 30 while the upwardly projecting part of this enlargement may be substantially aligned with the decorative moulding or hinge member disposed at the center of the hood and cowl assembly, as shown in Fig. 2. Obviously a third rod corresponding to the rack rods 34 may be provided at the center of the element 30 in place of the enlargement 68. Such a third rod may be driven by the shaft 61 in the same manner as the illustrated rods 34, thus being effective in positively assuring the proper position of the central part of the wiper element 30.

At each end of the channel 25, the gutter 62 may communicate with a sheet metal drain 67, Figs. 12 and 17, a small housing 68 being provided around the gear 37 and providing a bearing for shaft 60. Thus moisture which is received in the gutter or which passes down along the rack bar 36, is received by this drain 67, the lower end of which may extend to an outlet at the bottom of the body.

As shown particularly in Fig. 12, the instrument board 70 may be in the form of a metal channel forming a portion of the framing of the vehicle, and having its ends connected to the channels 1 by sheet metal brackets 72 of the general form shown in Fig. 18.

It is evident that this arrangement of the windshield wiper permits the wiper and its operating mechanism to be substantially concealed when the wiper is not in use, while when in use substantially the only part of the mechanism which is visible is the actual working element, the driving parts being concealed in the cowl and windshield standard assemblies.

Figure 19:
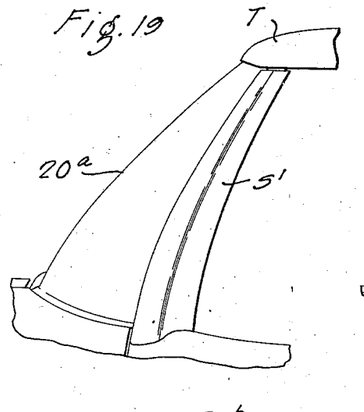
Figs. 19 and 20 are side elevations of optional types of windshields.

Fig. 19 illustrates a type of windshield similar to that disclosed in Fig. 5, but wherein the screen 20$^a$ and standards S$^1$ may have a curvature in a generally vertical direction. This type of wind screen may have substantially the form that would be imparted by moving a slightly curved line through the same general path as the straight line which might be employed in generating a surface of a screen of the type illustrated in Fig. 3. A wiper of the type already disclosed may be employed with this type of windshield.

Figure 20:
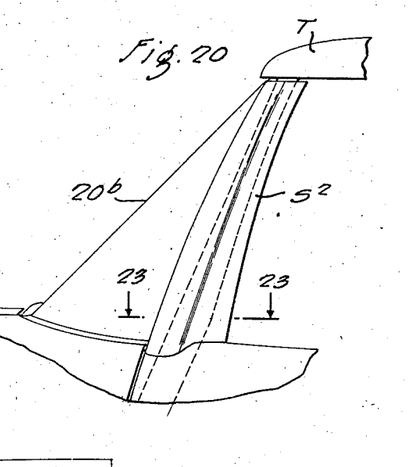
Figure 21:
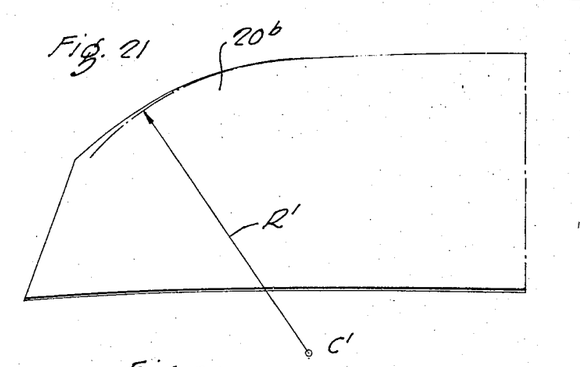
Fig. 21 is a plan view somewhat schematical in character and similar to Fig. 3 showing the form of wind screen illustrated in Fig. 20.

Fig. 20 illustrates a windshield including a glass screen 20$^b$ and a standard assembly S$^2$ of the same general type as illustrated in Fig. 1 but with a substantially greater inclination of the glass screen to the standards. Obviously with this arrangement the method of laying out or determining curvature of the lower part of the glass screen may be similar to that previously described, the top view of the screen and the arrangement of an arc R$^1$ drawn about a center C$^1$ of Fig. 21 corresponding to the disclosure of Fig. 3.

Figure 22:
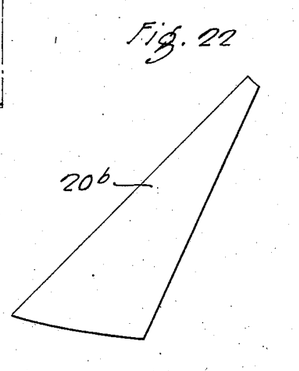
Fig. 22 is a side elevation of the wind screen shown in Fig. 21.
Figure 23:
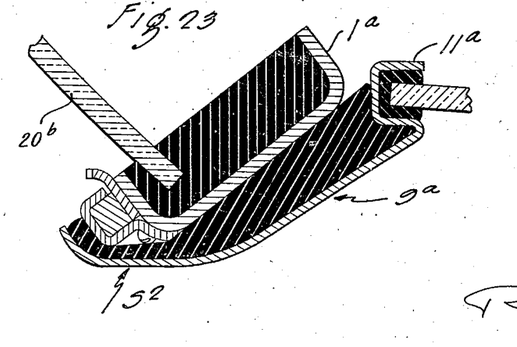
Fig. 23 is a section on line 23—23 of Fig. 20.

Fig. 22 illustrates the shape of the screen 20$^b$ as viewed in side elevation. With a windshield assembly of the type illustrated in Fig. 20, the front edge of the side window ordinarily will not be concealed throughout its vertical path unless the window is moved upwardly and rearwardly as, for example, to meet a rear window or panel, as disclosed in my Patent 1,826,922. Furthermore, with this arrangement the disposition of the window channel 11$^a$ and the shape of the door post 9$^a$ may be somewhat different, particularly at the lower part of the standard from that illustrated in Fig. 6. In Fig. 23 the channel 11$^a$ is spaced outwardly in relation to the inner corner of the standard proper 1$^a$ to avoid a too great inclination of the side window. The general arrangement of the section of the upper part of the standard assembly may be similar to that of Fig. 7.

Obviously both the windshields shown in Fig. 19 and Fig. 20 may be arranged in combination with windshield wipers of the type already described.

Figures 25, 26, 27, 28:
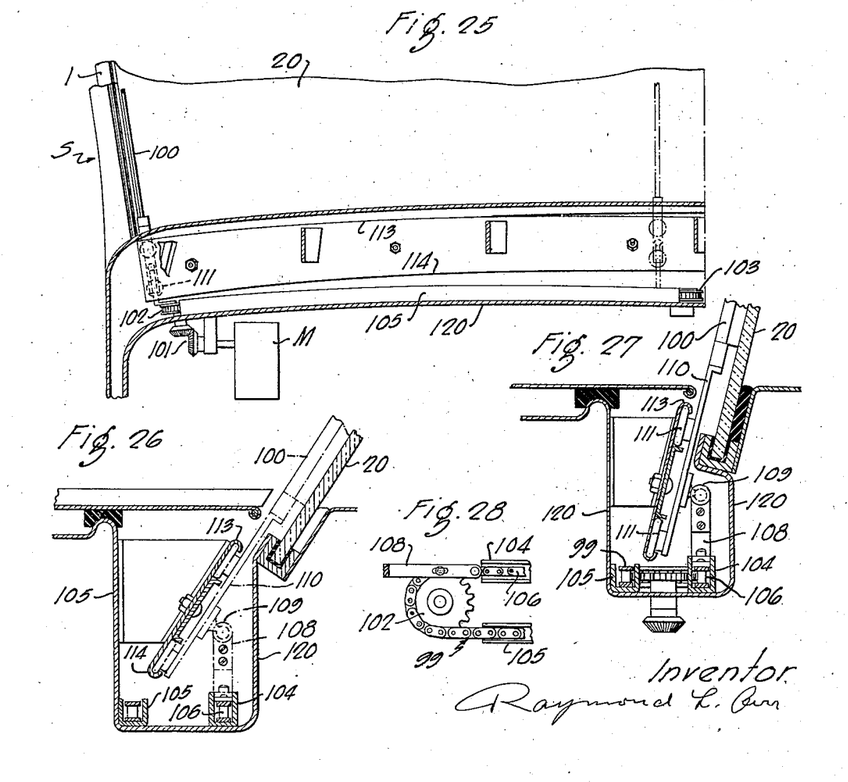
Fig. 25 is a front view of a part of the assembly shown in Fig. 24, parts being broken away and shown in section.
Figs. 26 and 27 are sections on lines 26—26 and 27—27 respectively of Fig. 24.
Fig. 28 is a detail plan view of a part of the assembly shown in Fig. 24.

Figs. 24 to 28 inclusive illustrate an optional form of windshield wiper as applied to a windshield of the type illustrated in Figs. 1 and 5. In this embodiment of the invention the wiper element 100 may move between an outwardly and slightly, rearwardly inclined position adjoining the inner face of the windshield standard, as shown at the left of Figs. 24 and 25, to a rearwardly inclined position wherein the wiper element lies substantially in the central longitudinal plane of the vehicle or parallel thereto, as shown at the right of Figs. 24 and 25. Thus the wiper element substantially follows the path which would be defined by a theoretical straight line generating a surface having a shape similar to that of the outer face of the glass screen.

Any suitable mechanism may be employed for driving the wiper element 100. As shown, driving mechanism M of the general character illustrated in Figs. 9 and 10 may be connected by beveled gears 101 to a sprocket 102 at one end of a chain 99, a suitable idler sprocket 103 being disposed at the other end of the chain. The runs of this chain may be arranged to follow curved paths as determined by channels 104 and 105, the chain and channels being disposed in a sheet metal housing 120 within the cowl assembly. Preferably the rear run 106 of the chain which moves in channel 104 may carry a bracket 108 connected to adjoining links of the chain by a pin and a pin and slot connection and supporting a ball and socket mounting 109 upon which a swinging support 110 is mounted.

Suitable rollers 111 are pivotally mounted upon the support 110 and engage upper and lower guide tracks 113 and 114, respectively, which are fixedly mounted in the housing 105. The tracks 113 and 114 are arranged to assure the proper tilting of the wiper element 110 laterally as it moves from its central position to its position adjoining or in engagement with the windshield standard, while the curvatures of these guide elements as well as the curvature of the path 25 followed by the gimbal assembly 109 assures the wiper element following a proper rearwardly curved path as it approaches the windshield standard.

It is evident that the mechanism M is arranged to cause the reciprocating movement of the wiper from a position adjoining the center of the vehicle to a position adjoining the windshield standard assembly. Any suitable drain may be connected to the housing 120 to receive water therefrom.

It is evident that this invention affords windshields shaped to afford particularly large fields of vision between the opaque standards, and that the latter may afford relatively small obstructions to vision. Furthermore these windshields which are generally curved may be provided with wiper elements that when inoperative are concealed or unobtrusive and when operating may effectively wipe the glass despite its curvature.

While it is evident that transparent screens of the type claimed herein have intermediate portions that may be without substantial curvature or are planar and that such portions may be cleaned by conventionally located and operated wipers, the present invention permits not only the effective wiping of such portions but also of the end portions of the screens with their varying curvatures.

I claim:

1. In a vehicle body, a windshield including windshield standards on opposite sides of the body, and a transparent screen extending therebetween, said screen having the ends of its lower edge provided with substantially forwardly extending curvatures while having the intermediate portion of this edge without substantial curvature and spaced substantially ahead of the standards, the upper edge of the screen having a relatively slight curvature.

2. In a vehicle body, a windshield comprising standards at opposite sides of the body, a continuous glass screen extending between the standards and shaped so that its lower margin has a substantially forward curvature away from the windshield standards so that the midportion of its forward edge is spaced at a substantial distance ahead of the standards, its upper edge being substantially within the transverse plane of the upper portions of the standards.

3. In a vehicle, a windshield comprising standards at opposite sides of the vehicle body, and a generally curved glass screen extending between the standards, the intermediate part of the glass screen having a substantially upward and rearward inclination, the standards being proportioned so that their greatest dimensions are disposed at a substantially acute angle to the longitudinal axis of the vehicle and so that their minimum dimensions are disposed substantially at right angles to their maximum dimensions, whereby relatively small obstructions to vision may be afforded to occupants of the vehicle, the angle between the greatest dimension of the lower part of each standard and the longitudinal axis of the vehicle being less than that between the longitudinal axis of the vehicle and the direction of the greatest dimension of the upper part of the standard.

4. In a vehicle body, a windshield comprising standards at opposite sides of the body, and a continuous glass screen therebetween, the standards having an upward and rearward inclination, the ends of the screen having substantial curvatures, the intermediate part of the screen being relatively straight and having a substantially greater rearward inclination than that of the standards.

5. In a vehicle body, the combination comprising a windshield including opposite standards, a forwardly curved or bulged transparent screen, a flexible wiper element extending across the screen, movable parts arranged adjoining the standards and connected to the wiper element, and driving mechanism to cause the reciprocatory movement of the parts upwardly and downwardly to cause the upward and downward movement of the wiper element over the windshield screen, said driving mechanism including a driving motor, speed reduction means connected to the driving motor, a reciprocating part movable at relatively low speed by said means, and gear means connecting said part to the parts movable adjoining the windshield standards.

6. In a vehicle body, the combination comprising windshield standard assemblies, and a forwardly curved or bulged glass screen therebetween, a flexible wiper element extending across the screen, and parts movable within the windshield standard assemblies and connected to the wiper element to cause the upward and downward movement of the element while pulling it taut under tension against the screen.

7. In a vehicle body, the combination comprising windshield standard assemblies, and a forwardly curved or bulged glass screen therebetween, a flexible wiper element extending across the screen, parts movable within the windshield standard assemblies and connected to the wiper element to cause the upward and downward movement of the element, and a gutter extending along the lower margin of the screen and arranged to receive the wiper element in a substantially retracted inoperative position at the lower end of the path of the element.

8. In a vehicle body, the combination comprising a windshield including windshield standard assemblies, a transparent screen extending between the assemblies, said screen being forwardly curved or bulged, and a flexible wiper element extending between the windshield standard assemblies, driving mechanism associated with said assemblies and connected to opposite ends of the wiper element, said mechanism being arranged to move the wiper element upwardly and downwardly over the major exposed surface of the screen with a substantially harmonic motion so that the wiper's speed is relatively high at the intermediate part of its path and so that its speed is substantially reduced as it approaches the upper and lower ends of its path.

9. In a vehicle body, the combination comprising a windshield with a varying curvature so that it is substantially curved at its edge portion and substantially planar at its mid portion, a windshield wiper moving over one of said edge portions and the mid portion despite said varying curvature, and operating means for said wiper imparting a reciprocatory substantially harmonic motion thereto.

10. In a vehicle body, the combination comprising a windshield including opposite standards, a forwardly curved or bulged glass screen, a flexible wiper element extending across the screen, movable parts arranged adjoining the standards, a yieldable member connecting said parts and the ends of the element so that the element may be held taut, and driving means for said parts.

11. In a vehicle, a windscreen having a lower edge with substantial curvatures at its ends, the mid portion of said edge and the upper edge of said screen having substantially less curvature, said screen having a general shape that may be imparted by a generating line moving transversely from edge to edge of the screen when said line is moved to tilt slightly in a lateral direction when near the outer edge of the screen, whereby the upper and lower parts of the screen may have unequal widths, a wiper being arranged so that it may substantially follow the path of such a generating line, and driving and guiding means for said wiper causing its movement across the screen while imparting a tilting movement thereto.

12. In a vehicle body, the combination comprising a windshield including opposite standards, a forwardly curved or bulged glass screen, a flexible wiper element extending across the screen, movable parts arranged adjoining the standards, means associated with the mid portion of said element to prevent its twisting at the ends of its path, and driving means for said parts.

13. In a vehicle body, the combination comprising a windshield including opposite standards, a forwardly curved or bulged glass screen, a flexible wiper element extending across the screen, movable parts arranged adjoining the standards, and driving means for said parts causing them to have substantially harmonic movements.

14. In a vehicle, the combination comprising a windshield having upwardly and rearwardly inclined standards, a continuous transparent screen extending between the standards, said screen having an intermediate portion without substantial transverse curvature but with a steeper rearward inclination than that of the standards, the lower part of said portion being spaced appreciably ahead of the standards, the upper part of said portion being disposed substantially between the upper ends of the standards, the screen having end portions with substantial rearward curvatures at their lower edges, said curvatures decreasing toward the upper part of the screen so that the entire upper edge of the screen is without substantial curvature, and a windshield wiper mechanism including a wiper element effective to wipe the major portion of the area of the screen at least at one side of the longitudinal median plane of the vehicle, said element wiping both the intermediate portion of the screen and an end portion with its varying curvature.

15. In a vehicle, the combination comprising a windshield having upwardly and rearwardly inclined standards, a continuous transparent screen extending between the standards, said screen having an intermediate portion without substantial transverse curvature but with a steeper rearward inclination than that of the standards, the lower part of said portion being spaced appreciably ahead of the standards, the upper part of said portion being disposed substantially between the upper ends of the standards, the screen having end portions with substantial rearward curvatures at their lower edges, said curvatures decreasing toward the upper part of the screen so that the entire upper edge of the screen is without substantial curvature, and a windshield wiper mechanism including a wiper element effective to wipe the major portion of the area of the screen at least at one side of the longitudinal median plane of the vehicle, said element wiping both the intermediate portion of the screen and an end portion with its varying curvature, said wiper element being flexible and extending transversely, the element being movable upwardly and downwardly over the surface of the screen and being held taut against the same.

16. In a vehicle, the combination comprising a windshield having upwardly and rearwardly inclined standards, a continuous transparent screen extending between the standards, said screen having an intermediate portion without substantial transverse curvature but with a steeper rearward inclination than that of the standards, the lower part of said portion being spaced appreciably ahead of the standards, the upper part of said portion being disposed substantially between the upper ends of the standards, the screen having end portions with substantial rearward curvatures at their lower edges, said curvatures decreasing toward the upper part of the screen so that the entire upper edge of the screen is without substantial curvature.

17. In a vehicle, the combination comprising a windshield having upwardly and rearwardly inclined standards, a continuous transparent screen extending between the standards, said screen having an intermediate portion without substantial transverse curvature but with a steeper rearward inclination than that of the standards, the lower part of said portion being spaced appreciably ahead of the standards, the upper part of said portion being disposed substantially between the upper ends of the standards, the screen having end portions with substantial rearward curvatures at their lower edges, said curvatures decreasing toward the upper part of the screen so that the entire upper edge of the screen is without substantial curvature, each standard having its maximum cross-sectional dimension disposed at an acute angle to the longitudinal axial plane of the vehicle and its minimum cross-sectional dimension extending substantially at right angles to its maximum dimension thereby affording a relatively small obstruction to vision.

18. In a vehicle body, the combination comprising a front seat, a steering wheel, a top including a transverse header at its front, a windshield having opposite upwardly and rearwardly inclined standards extending upwardly to the header, and a transparent screen between the standards, said screen having a substantially planar intermediate portion which is more steeply inclined than said standards and the upper edge of which is wider than the lower edge and is received in the header of the top substantially between the standards, the end portions of the screen having similar appreciably curved end portions, one of which curves rearwardly about the front of the steering wheel, said curved end portions having decreasing widths and gradually decreasing curvatures toward the top of the vehicle and each affording an entirely convex curvature for the outer surface of the corresponding screen portion, the standards being disposed substantially beside a part of the seat, the header being disposed over the seat and being substantially free from any forwardly bulged intermediate portion, whereby a relatively large field of vision is afforded between the standards and below the header.

19. In a vehicle, the combination comprising a windshield having upwardly and rearwardly inclined standards, a continuous transparent screen extending between the standards, said screen having a substantially planar portion which is more steeply inclined than the standards, the upper edge of said portion extending substantially the entire distance between the corresponding parts of the standards, the lower edge of said portion being narrower than its upper edge and having ends spaced from the standards, the lower edge of said screen having rearwardly curved parts extending from said ends to the standards, the screen having curved areas between said substantially planar portion and the standards, said areas decreasing in width toward the upper part of the screen and each affording an entirely convex curvature for the outer surface of the corresponding screen portion.

RAYMOND L. CARR.